United States Patent [19]
Gladrow et al.

[11] 4,289,606
[45] Sep. 15, 1981

[54] HYDROCARBON CRACKING WITH MIXTURE OF ZEOLITES Y AND ZSM-5

[75] Inventors: Elroy M. Gladrow; William E. Winter, both of Baton Rouge, La.

[73] Assignee: Exxon Research & Engineering Co., Florham Park, N.J.

[21] Appl. No.: 131,646

[22] Filed: Mar. 19, 1980

Related U.S. Application Data

[62] Division of Ser. No. 44,394, May 31, 1979, Pat. No. 4,239,654.

[51] Int. Cl.$^3$ ............................................. C10G 11/05
[52] U.S. Cl. ............................. 208/120; 208/DIG. 2
[58] Field of Search ......................................... 208/120

[56] References Cited

U.S. PATENT DOCUMENTS

| 3,402,996 | 9/1968 | Maher et al. | 252/455 Z |
| 3,702,886 | 11/1972 | Argauer et al. | 423/328 |
| 3,758,403 | 9/1973 | Rosinski et al. | 208/120 |
| 3,764,520 | 10/1973 | Kimberlin et al. | 208/111 |
| 3,769,202 | 10/1973 | Plank et al. | 208/111 |
| 3,804,747 | 4/1974 | Kimberlin et al. | 208/120 |
| 3,871,993 | 3/1975 | Morrison | 252/455 Z |
| 3,894,934 | 7/1975 | Owen et al. | 208/120 |
| 3,925,195 | 12/1975 | Scherzer et al. | 208/120 |
| 4,137,152 | 1/1979 | Chester et al. | 208/120 |
| 4,164,465 | 8/1979 | Gladrow | 252/455 Z |

*Primary Examiner*—Delbert E. Gantz
*Assistant Examiner*—G. E. Schmitkons
*Attorney, Agent, or Firm*—Marthe L. Gibbons

[57] ABSTRACT

A hydrocarbon cracking catalyst comprises an ultrastable Y-type crystalline zeolite, a small pore crystalline ZSM-type zeolite, an inorganic oxide matrix and, optionally, a porous inert component. The cracking catalyst has a high activity and selectivity for the production of high octane naphtha fractions from higher boiling point hydrocarbonaceous oils. Catalytic cracking processes utilizing the catalyst are also provided.

12 Claims, No Drawings

HYDROCARBON CRACKING WITH MIXTURE OF ZEOLITES Y AND ZSM-5

This is a division, of application Ser. No. 044,394, filed May 31, 1979, now U.S. Pat. No. 4,239,654.

BACKGROUND OF THE INVENTION

1. Field of the Invention

The present invention relates to hydrocarbon cracking catalysts and uses thereof in catalytic cracking processes.

2. Description of the Prior Art

Hydrocarbon cracking catalysts comprising a zeolite dispersed in a siliceous matrix are known. See, for example, U.S. Pat. No. 3,140,249 and U.S. Pat. No. 3,352,796.

U.S. Pat. No. 4,137,152 discloses a cracking process utilizing a mixture of faujasite and mordenite.

U.S. Pat. No. 3,894,934 discloses catalytic cracking of hydrocarbons utilizing a large pore zeolite and a small pore zeolite such as zeolite ZSM-5. These zeolites may be dispersed in a common matrix.

U.S. Pat. No. 3,871,993 discloses a process for upgrading the octane value of naphtha utilizing a shape selective catalyst such as zeolite ZSM-5, ZSM-11, ZSM-12, ZSM-21, mordenite, etc., in the absence of added hydrogen.

U.S. Pat. No. 3,702,886 discloses use of ZSM-5 zeolite alone or in combination with other materials such as zeolites or inert materials for catalytic cracking of hydrocarbons, see particularly columns 6 and 7.

U.S. Pat. No. 3,804,747 discloses a hydrocarbon conversion process utilizing a mixture of zeolites X and Y.

U.S. Pat. No. 3,758,403 discloses catalytic cracking comprising a large pore zeolite, such as zeolite Y, and a small pore zeolite, such as ZSM-5, in a siliceous matrix. The matrix may be active or inactive, such as silica-alumina or alumina. The use of the ZSM-5 type zeolite results in obtaining a fuel of increased octane number.

U.S. Pat. No. 3,769,202 discloses a combination catalyst comprising a mixture of two different zeolites, one having a pore size greater than 8 Angstroms and the other having a pore size of less than 7 Angstroms. The zeolites are mixed with an inorganic oxide matrix such as silica-alumina. The catalyst is suitable for cracking and hydrocracking of the hydrocarbons.

U.S. Pat. No. 3,925,195 discloses a cracking process utilizing a catalyst comprising a mixture of rare earth hydrogen Y-type zeolite, and hydrogen or transition metal exchanged mordenite, calcium exchanged type A zeolite, or hydrogen exchanged erionite and an amorphous matrix.

U.S. Pat. No. 3,764,520 discloses a catalyst comprising a mixture of two different zeolites, one having a pore size within the range of 6 to 15 Angstroms and the other having a pore size of less than 6 Angstroms in combination with an inorganic oxide support. The catalyst is useful for hydrocarbon conversion processes to give increased selectivity.

SUMMARY OF THE INVENTION

In accordance with the invention there is provided:

(a) an ultrastable Y-type crystalline aluminosilicate zeolite having less than about 1 weight percent rare earth metals, calculated as the elemental metal, based on the zeolite;

(b) a ZSM-type zeolite; and (c) a catalytic inorganic oxide matrix.

In one embodiment of the invention the catalyst additionally comprises a porous inorganic oxide having specific physical characteristics.

Furthermore, in accordance with the invention there is provided, a catalytic cracking process utilizing the above-stated catalyst.

DETAILED DESCRIPTION OF THE INVENTION ULTRASTABLE Y-TYPE ZEOLITE COMPONENT

"Stabilized" or ultrastable Y-type zeolites are well known. They are described, for example, in U.S. Pat. Nos. 3,293,192 and 3,402,996 and the publication, Society of Chemical Engineering (London) Monograph Molecular Sieves, page 186 L (1968) by C. V. McDaniel and P. K. Maher, the teachings of which are hereby incorporated by reference. In general, "ultrastable" refers to Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size reduction. The ultrastable zeolite is identified both by the smaller unit cell and the low alkali metal content in the crystal structure.

As is generally known, the ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 1000° F. to 1500° F. for up to several hours, cooled and thereafter again successively base exchanged with an aqueous solution of an ammonium salt until the alkali metal content is reduced to less than 1 weight percent, followed by washing and calcination again at a temperature of 1000° to 1500° F. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite. The particle size of the zeolites is usually in the range of 0.1 to 10 microns, more particularly in the range of 0.5 to 3 microns. For use in the present invention, the ultrastable Y-type zeolite components of the catalyst will be substantially free of rare earth metals such as for example cerium, lanthanum, praseodymium, neodymium, promethium, samarium, europium, gadolinium, terbium, dysprosium, holmium, erbium, yttrium, thulium, scandium, lutecium and mixtures thereof. By "substantially rare earth free" is meant that the rare earth metal content of the zeolite will be less than about 1 weight percent, calculated as the elemental metal based on the zeolite. Similarly small amounts (1 weight percent) of magnesium or calcium ions may be exchanged into the zeolite.

Suitable amounts of the ultrastable Y-type zeolite in the catalyst of the present invention include from about 0.1 to about 40 weight percent, preferably from about 5 to about 25 weight percent, based on the total catalyst.

THE SMALL PORE ZEOLITE COMPONENT

Suitable small pore zeolites are the zeolites of the type designated "ZSM" by Mobil, particularly ZSM-5 type zeolites such as those described in U.S. Pat. No. 3,702,886 and in *Nature* 272, pages 437–438, Mar. 30, 1978.

The ZSM-5 type zeolites are shape selective for adsorption of normal and methyl substituted paraffins and are known to be effective to crack normal and slightly branched paraffins.

The original cations of the small pore zeolites can be replaced by ion exchange by methods well known in the art. Part or all of the original cations can be replaced by tetraalkyl ammonium cations, metal ions, ammonium ions and hydrogen ions. More preferably, the hydrogen form of the small pore zeolite component of the catalyst of the present invention is used. Suitable weight ratio of ultrastable Y-zeolite to small pore zeolite ranges from about 1:1 to 20:1.

THE INORGANIC OXIDE GEL MATRIX

Inorganic oxide gels suitable as components of the catalyst of the present invention are amorphous catalytic inorganic oxides such as silica, silica-alumina, silica-zirconia, silica-magnesia, alumina-boria, alumina-titania and the like, and mixtures thereof. Preferably, the inorganic oxide gel is a silica-containing gel, more preferably the inorganic oxide gel is an amorphous silica-alumina component such as a conventional silica-alumina cracking catalyst, several types and compositions of which are commercially available. These materials are generally prepared as a cogel of silica and alumina or as alumina precipitated on a preformed and preaged silica hydrogel. In general, silica is present as the major component in the catalytic solids present in such gel, being present in amounts ranging from about 55 to about 100 weight percent, preferably silica will be present in amounts ranging from about 70 to 90 weight percent. Particularly preferred are two cogels, one comprising about 75 weight percent silica and 25 weight percent alumina and the other comprising from about 87 weight percent silica and 13 weight percent alumina. The inorganic oxide gel component may suitably be present in the catalyst of the present invention in amounts ranging from about 40 to about 90 weight percent, preferably from about 55 to about 75 weight percent, based on the total catalyst.

THE POROUS INERT COMPONENT

Optionally, a porous inert inorganic oxide may be used as component in the catalyst of the present invention.

The porous inert inorganic oxide component of the catalyst of the present invention may be present in the finished catalyst in amounts ranging from about 5 to about 35 weight percent, preferably from about 10 to about 30 weight percent, based on the total catalyst. The inert porous component can be chosen from a wide variety of solid porous catalytically inert materials. The term "catalytically inert" is intended herein to designate that the porous material has substantially no catalytic cracking activity or has less catalytic cracking activity than the inorganic oxide gel component of the catalyst.

Preferably, the inert material will be a bulk material. The term "bulk" with reference to the porous material is intended herein to designate a material which has been preformed and placed in a physical form such that its surface area and pore structure is stabilized so that when it is added to an impure inorganic gel containing considerable amounts of residual soluble salts, the salts will not alter the surface and pore characteristics appreciably, nor will they promote chemical attack on the preformed inert material which could then undergo change. For example, addition of "bulk" alumina will mean a material which has been formed by suitable chemical reaction, the slurry of hydrous alumina aged, filtered, dried, washed free of residual salts and then heated to reduce its volatile content to less than about 15 weight percent. If desired, the washed, aged hydrous alumina filter cake can be reslurried with water and used in making the composite catalyst. The resulting inert material is suitable for use as the porous inert material of the present invention. Suitable materials for use as inert material in the catalyst of the present invention include alumina, titania, zirconia, magnesia and mixtures thereof. Preferably, the porous material is a bulk alumina which may additionally be stabilized with from about 0.5 to about 6 weight percent silica. Alumina stabilized with silica is commercially available. A preferred inert porous material for use as component of the catalyst is one having initially, after heating at 1000° F. in air for six hours, a surface area greater than about 20 square meters per gram (BET method-Brunauer, Emmett and Teller, see Van Nostrand Chemist's Dictionary 1953 edition), preferably greater than 100 m$^2$/g, preferably at least 200 m$^2$/g and a pore volume greater than about 0.25 cubic centimeter per gram. Desirably, the inert porous material has at least 0.2 cubic centimeters per gram pore volume in the pores having diameters ranging from about 90 to about 200 Angstroms. These stated physical characteristics are those of the porous inert material when taken separately after calcining 6 hours at 1000° F. and prior to being composited with the other components.

Alternatively and optionally, an alumina hydrosol or hydrogel or hydrous alumina slurry may be used, provided that the ultimate porous inert component, when dried and calcined separately has physical characteristics within the above stated ranges.

The catalysts of the present invention may be prepared by any one of several methods. The preferred method of preparing one of the catalysts of the present invention, that is, a catalyst comprising silica-alumina and as porous inert material, alumina, is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. Separately, a bulk alumina may be prepared, for example, by reacting solutions of sodium aluminate and aluminum sulfate, under suitable conditions, ageing the slurry to give the desired pore properties to the alumina, filtering, drying, reslurrying in water to remove sodium and sulfate ions and drying to reduce volatile matter content to less than 15 weight percent. The alumina is then slurried in water and blended, in proper amount, with the slurry of impure silica/alumina hydrogel.

The zeolites are added to this blend. A sufficient amount of each component is utilized to give the desired final composition. The resulting mixtures may be filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent.

The catalyst of the present invention is suitable for catalytic cracking. Catalytic cracking with the catalyst of the present invention can be conducted in any of the conventional catalytic cracking manners. Suitable catalytic cracking conditions include a temperature ranging from about 750° to about 1300° F. and at a pressure ranging from about atmospheric to about 100 psig, typically from about atmospheric to about 20 psig. The catalytic cracking process may be carried out as a fixed bed, moving bed, ebullating bed, slurry, transferline (disperse phase) or fluidized bed operation. The catalyst of the present invention is especially suitable for use in a fluidized bed and transferline catalytic cracking process. The catalyst may be regenerated at conditions which include a temperature in the range of about 1100° F. to about 1500° F., preferably from about 1175° F. to about 1350° F.

DESCRIPTION OF THE PREFERRED EMBODIMENTS

The following examples are presented to illustrate the present invention.

EXAMPLE 1

This example describes the preparation of catalysts. Their cracking performance is described in a subsequent example.

Catalyst A is a commercially used catalyst believed to comprise about 16 weight percent of rare earth-containing Y-type faujasite, about 28 weight percent kaolin and about 56 weight percent silica-alumina gel matrix. The final catalyst comprises about 2.9 weight percent rare earth metal oxides, based on the total catalyst. Catalyst A is a catalyst of reference.

Catalyst B is also a catalyst of reference. It was made as follows:

(a) a dilute sodium silicate solution (about 5 weight percent $SiO_2$) was gelled by admixing with $CO_2$ under pressure, ageing the gel to give the desired pore properties, admixing with aluminum sulfate solution and adjusting the pH of the impure gel to about 5 to 5.5;

(b) the gel is admixed with a slurry of ultrastable Y faujasite crystals and then a slurry of bulk alumina stabilized with about 2.5 weight percent silica. The composite slurry was colloid milled twice to assure homogeneity and spray dried;

(c) The material was washed with ammonium sulfate solution to remove extraneous soluble salts, rinsed with $H_2O$ and dried. The catalyst comprised about 20 weight percent ultrastable Y-type faujasite, 20 weight percent alumina and 60 weight percent silica-alumina gel.

Catalyst C, which is a catalyst in accordance with the present invention, was made in a manner similar to catalyst B except that in step (b), the gel was admixed with a mixed slurry of ultrastable Y zeolite and a zeolite similar to the zeolite described in the literature as ZSM-5. The overall preparation procedure was the same as for catalyst B. Catalyst C comprises about 18 weight percent ultrastable Y-type zeolite, 2 weight percent of a ZSM-5 type zeolite, 20 weight percent bulk alumina and 60 weight percent silica-alumina gel.

Catalyst D, which is a catalyst in accordance with the present invention, was made in a similar manner to catalyst C except that the relative proportions of ultrastable Y-type faujasite and ZSM-5 type zeolite were changed. Catalyst D comprised about 15 weight percent ultrastable Y-type zeolite, 5 weight percent of a ZSM-5 type zeolite, 20 weight percent bulk alumina stabilized with silica and 60 weight percent silica-alumina gel.

EXAMPLE 2

This example compares the cracking performance and the cracked product qualities of the catalysts of the present invention, namely, catalysts C and D, with the reference catalysts A and B. Catalysts A, B, C and D were each calcined at 1000° F. for 6 hours and then steamed at 1400° F. and 0 psig pressure for 16 hours. The catalysts were evaluated for cracking activity in a standard microactivity test. The results are summarized in Table I. The catalysts were also evaluated for cracking performance in a full cycle cracking operation. The unit is a circulating fluidized catalytic cracking unit with a regenerator and reactor/stripper vessels. It is operated once-through, that is, there is no recycle oil mixed with fresh feed. Reactor temperature was 925° F. and regenerator temperature was 1105° F. The feedstock was 560° to 1050° F. boiling range (at atmospheric pressure) vacuum gas oil. The unit was operated at a constant catalyst to oil weight ratio of 4. The results of one set of tests utilizing catalysts A, B and D are summarized in Table I. The catalysts were compared at a constant 70 volume percent conversion (430° F.$^-$). The results show that reference catalyst B and catalyst D, which is a catalyst in accordance with the present invention, each gives substantially higher activity and superior octane number $C_5$/430° F. naphtha relative to the commercial reference catalyst A. Furthermore, use of the higher $C_3$ and $C_4$ olefins products as feed to an alkylation unit would result in a substantial net increase in total naphtha yield for both catalysts B and D relative to catalyst A. Comparing catalyst D with reference catalyst B (which has the same components except for the ZSM-5 type zeolite), it can be seen that the addition of the ZSM-5 type zeolite to the catalyst resulted in a substantial increase in naphtha octane numbers. It is to be noted that the increase in motor octane is greater than the increase in research octane. Furthermore, when potential alkylate is combined with $C_5$/430° F. cracked naphtha, a substantially higher total naphtha yield is obtainable with catalyst D, which is a catalyst in accordance with the present invention.

TABLE I

| Catalyst | A | B | D |
|---|---|---|---|
| MAT Conversion[3] | 69 | 73.5 | 76.7 |
| Yields & Product Qualities @ 70% Conversion | | | |
| $H_2$, wt. % | 0.056 | 0.062 | 0.042 |
| $C_3^-$ dry gas, wt. % | 5.6 | 6.4 | 8.1 |
| Total $C_4$, vol % | 13.1 | 11.8 | 16.9 |
| Coke, wt. % | 3.5 | 2.7 | 3.0 |
| $C_5$/430 Naphtha, Vol. % | 60.5 | 62 | 55 |
| RONC[1] | 90.8 | 93.8 | 95.2 |
| MONC[2] | 79.8 | 80.5 | 83.1 |
| $\frac{R + M}{2}$ | 85.3 | 87.2 | 89.2 |
| $C_3^=$, vol. % | 3.7 | 4.4 | 6.3 |
| $C_4^=$, vol. % | 6.8 | 7.6 | 11.3 |
| $C_5$/430 + Alk., vol. % | 82.0 | 87.0 | 91.4 |

[1] Research Octane Number Clear
[2] Motor Octane Number Clear
[3] Microactivity Test - see Oil & Gas Journal, 1966 vol. 64, pp. 7, 84, 85 and Nov. 22, 1971, pp. 60-68.

In a second set of experiments, catalysts B, C and D, after steaming at 1400° F., were tested for cracking performance in a similar manner to the one described above. The results are summarized in Table II. The catalysts were compared at a constant 65 volume percent conversion (430° F.⁻).

TABLE II

| Catalyst | B | C | D |
|---|---|---|---|
| ZSM-5 type, wt. % | 0 | 2 | 5 |
| USY type, wt. % | 20 | 18 | 15 |
| Product Yields and Qualities at 65 vol. % Conversion | | | |
| $H_2$, wt. % | 0.08 | 0.04 | 0.03 |
| $C_3H_6$, wt. % | 3.6 | 4.7 | 5.4 |
| $C_4H_3$ (tot), vol. % | 7.0 | 8.4 | 10.6 |
| Carbon, wt. % | 2.5 | 2.0 | 2.5 |
| $C_5/430°$ F., vol. % | 58.5 | 55.5 | 53.0 |
| RON Clear | 93.4 | 94.4 | 94.8 |
| MON Clear | 80.3 | 80.9 | 81.2 |
| $\frac{R + M}{2}$ | 86.8 | 87.7 | 88.0 |
| $C_5/430°$ F. + alkylate, vol. % | 80.3 | 80.3 | 85.9 |

The advantages of incorporating minor amounts of ZSM-5 type of zeolite into cracking catalysts comprising ultrastable Y-type faujasite, bulk alumina and silica-alumina gel are shown by higher octane number cracked naphtha and, when combined with alkylate from the cracked light olefins, a potentially substantially higher total naphtha yield. Furthermore, hydrogen yields are decreased with the catalysts of the present invention.

What is claimed is:

1. A catalytic cracking process which comprises contacting a hydrocarbonaceous feed at catalytic cracking conditions in the absence of added hydrogen with a catalyst comprising:
   (a) an ultrastable Y-type crystalline alumino-silicate zeolite having less than about 1 weight percent rare earth metals, calculated as the elemental metal, based on the zeolite;
   (b) a small pore crystalline ZSM-5 type zeolite; and
   (c) a catalytic inorganic oxide matrix.

2. The process of claim 1 wherein said catalyst additionally comprises a porous inorganic oxide having initially a surface area greater than about 20 square meters per gram and a pore volume greater than about 0.25 cubic centimeter per gram.

3. The process of claim 2 wherein said porous inorganic oxide has initially a surface area greater than about 100 square meters per gram and at least 0.2 cubic centimeter per gram of its pore volume in pores having diameters ranging from 90 to 200 Angstroms.

4. The process of claim 1 wherein the weight ratio of said ultrastable Y-type zeolite to said small pore zeolite ranges from about 1:1 to about 20:1.

5. The process of claim 1 wherein said small pore crystalline zeolite is a ZSM-5 type zeolite.

6. The process of claim 5 wherein said ZSM-5 type zeolite is the hydrogen form of the ZSM-5 type zeolite.

7. The process of claim 2 wherein said porous inorganic oxide is selected from the group consisting of alumina, titania, zirconia, magnesia and mixtures thereof.

8. The process of claim 2 wherein said porous inorganic oxide comprises porous alumina.

9. The process of claim 2 wherein said porous inorganic oxide comprises alumina stabilized with from about 0.5 to about 6 weight percent silica.

10. The process of claim 1 wherein said matrix comprises silica-alumina.

11. The process of claim 1 wherein said catalyst comprises from about 5 to about 40 weight percent of said ultrastable Y-type zeolite.

12. The process of claim 1 wherein said catalytic cracking conditions include a temperature ranging from about 750° to 1300° F. and a pressure ranging from about 0 to 100 psig.

* * * * *